(12) United States Patent
Dethier

(10) Patent No.: US 9,803,625 B2
(45) Date of Patent: Oct. 31, 2017

(54) COUPLING OF A TURBOPUMP FOR MOLTEN SALTS

(71) Applicant: Cockerill Maintenance & Ingenierie S.A., Seraing (BE)

(72) Inventor: Alfred Dethier, Sprimont (BE)

(73) Assignee: Cockerill Maintenance & Ingenierie S.A., Seraing (BE)

( * ) Notice: Subject to any disclaimer, the term of this patent is extended or adjusted under 35 U.S.C. 154(b) by 132 days.

(21) Appl. No.: 14/403,844

(22) PCT Filed: May 23, 2013

(86) PCT No.: PCT/EP2013/060577
§ 371 (c)(1),
(2) Date: Nov. 25, 2014

(87) PCT Pub. No.: WO2013/174901
PCT Pub. Date: Nov. 28, 2013

(65) Prior Publication Data
US 2015/0107245 A1    Apr. 23, 2015

(30) Foreign Application Priority Data

May 25, 2012  (BE) .................................. 2012/0356
May 25, 2012  (EP) .................................... 12169483

(51) Int. Cl.
*F03G 6/06*     (2006.01)
*F01D 15/08*    (2006.01)
(Continued)

(52) U.S. Cl.
CPC ............. *F03G 6/067* (2013.01); *F01D 13/02* (2013.01); *F01D 15/08* (2013.01); *F01D 15/10* (2013.01);
(Continued)

(58) Field of Classification Search
CPC ....... Y02E 10/41; F24J 2/04; F24J 2/07; F24J 2/34; F03G 2006/008; F03G 6/067;
(Continued)

(56) References Cited

U.S. PATENT DOCUMENTS 4,688,990 A *  8/1987  Boster ................... F04D 29/628
                                                277/634
6,280,138 B1 *  8/2001  Inagi ....................... F04D 13/08
                                                415/122.1
(Continued)

FOREIGN PATENT DOCUMENTS

CN       101240947 A      8/2008
CN       202056843 U     11/2011
(Continued)

*Primary Examiner* — Mark Laurenzi
*Assistant Examiner* — Xiaoting Hu
(74) *Attorney, Agent, or Firm* — Reinhart Boerner Van Deuren P.C.

(57) ABSTRACT

The invention relates to a device comprising at least one vertical pump (3) and at least one associated turbine (4) for transporting, over a level difference, a heat-transfer fluid brought to a high temperature, wherein the device further comprises a device for mechanically coupling the turbine (4) with the pump (3), comprising a gearbox (21) with a gimbal coupling (41) located on the turbine (4) side, allowing the mechanical energy produced by the turbine (4) to be reused to actuate the pump (3).

7 Claims, 2 Drawing Sheets

Figure 1:
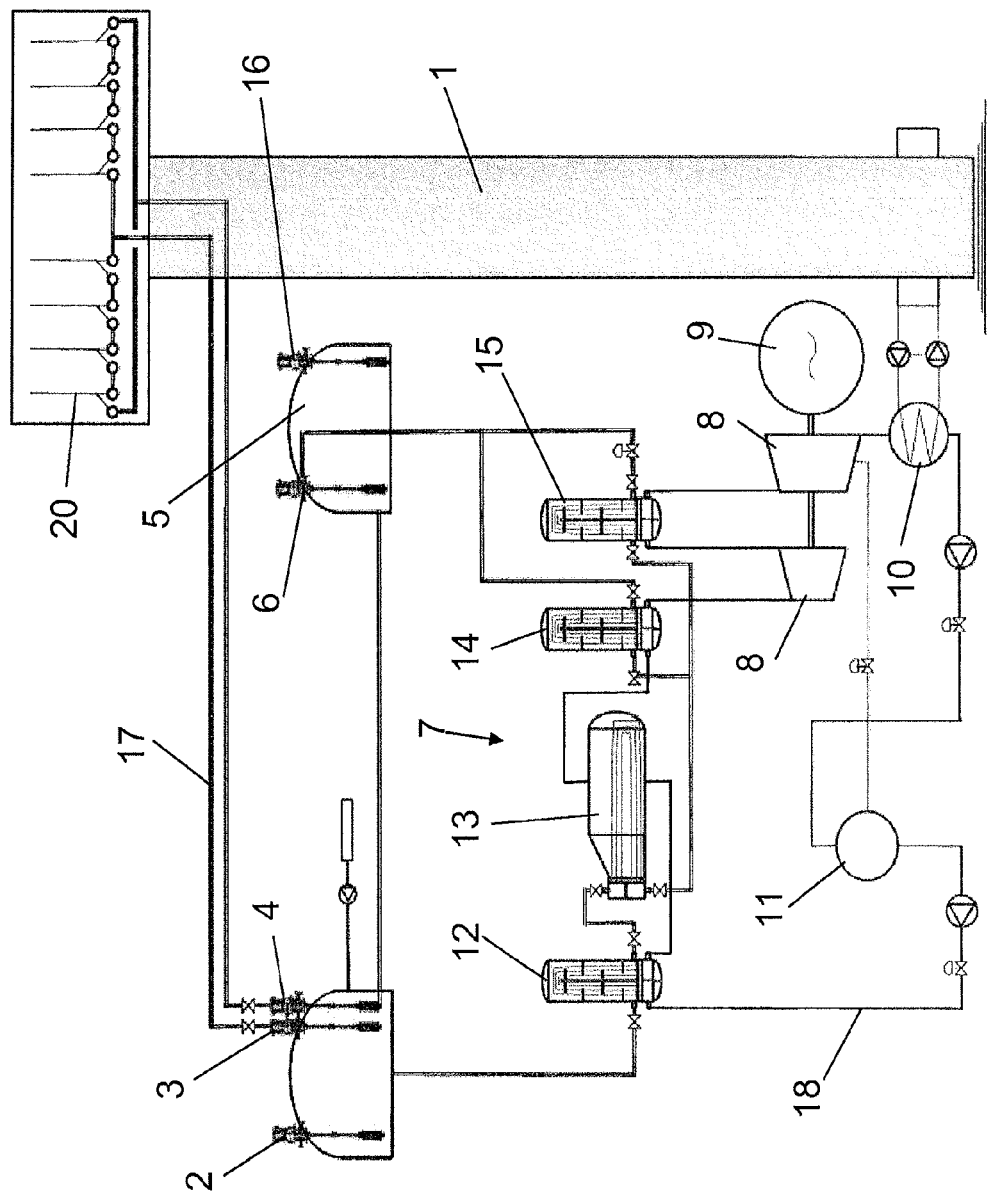

(51) Int. Cl.
| | |
|---|---|
| *F04D 7/02* | (2006.01) |
| *F04D 13/02* | (2006.01) |
| *F24J 2/34* | (2006.01) |
| *F03B 13/06* | (2006.01) |
| *F01D 15/12* | (2006.01) |
| *F04D 7/06* | (2006.01) |
| *F03B 13/00* | (2006.01) |
| *F04D 13/04* | (2006.01) |
| *F01K 3/12* | (2006.01) |
| *F01K 7/22* | (2006.01) |
| *F22B 1/00* | (2006.01) |
| *F01D 13/02* | (2006.01) |
| *F01D 15/10* | (2006.01) |
| *F04D 25/02* | (2006.01) |
| *F03G 6/00* | (2006.01) |
| *F28D 20/00* | (2006.01) |

(52) U.S. Cl.
CPC ............... *F01D 15/12* (2013.01); *F01K 3/12* (2013.01); *F01K 7/22* (2013.01); *F03B 13/00* (2013.01); *F03B 13/06* (2013.01); *F04D 7/02* (2013.01); *F04D 7/06* (2013.01); *F04D 13/02* (2013.01); *F04D 13/021* (2013.01); *F04D 13/04* (2013.01); *F04D 25/024* (2013.01); *F22B 1/006* (2013.01); *F24J 2/34* (2013.01); *F03G 2006/008* (2013.01); *F05D 2210/10* (2013.01); *F05D 2220/31* (2013.01); *F05D 2260/20* (2013.01); *F28D 2020/0047* (2013.01); *Y02E 10/41* (2013.01); *Y02E 10/46* (2013.01)

(58) Field of Classification Search
CPC . F03G 6/00; F03G 6/06; F04D 25/022; F04D 25/024; F04D 13/021; F04D 13/04; F04D 13/028; F04D 7/06; F04D 29/044; F04D 13/02–13/046; F04D 13/08–13/086; F04D 7/02; F28D 2020/0047; F01D 15/08; F01D 15/12; F04F 1/14; F03B 3/10; F03B 3/103; F03B 13/00; F03B 13/06
See application file for complete search history.

(56) References Cited

U.S. PATENT DOCUMENTS

| | | | | |
|---|---|---|---|---|
| 6,701,711 | B1* | 3/2004 | Litwin | F02C 1/05 60/641.11 |
| 7,806,665 | B2* | 10/2010 | Mello | E21B 43/126 166/68.5 |
| 2011/0113777 | A1* | 5/2011 | De Amicis | F28D 20/0034 60/641.8 |
| 2012/0091712 | A1* | 4/2012 | Hall | F02B 73/00 290/44 |
| 2015/0001854 | A1* | 1/2015 | Rivas | F01B 23/10 290/1 R |

FOREIGN PATENT DOCUMENTS

| | | |
|---|---|---|
| GB | 2449181 A | 11/2008 |
| WO | WO 2011/018814 A2 | 2/2011 |
| WO | WO 2011/077248 A2 | 6/2011 |
| WO | WO 2011/121852 A1 | 10/2011 |

* cited by examiner

COUPLING OF A TURBOPUMP FOR MOLTEN SALTS

FIELD OF THE INVENTION

The present invention relates to the field of thermal solar power plants. In particular, the subject-matter of the present application relates to concentrated solar power plants (CSP) of the type having tower solar receivers, using molten salts as heat-transfer fluid and in which vertical pumps are used for the circulation and transfer of the molten salts brought to a high temperature.

BACKGROUND OF THE INVENTION

In CSPs of the type having a central tower, a large number of heliostats (in the form of planar mirrors) reflect the solar light toward one or more solar receivers, situated at the apex of the tower, the heliostats being positioned such that the shadows created by the mirrors do not interfere with the adjacent mirrors.

The solar receiver, heated by the concentrated incident solar rays, will generate a hot fluid that will be next used at ground level to produce high-pressure steam capable of driving a turbine and of producing electricity.

The fluid heated at the apex of the tower can directly be steam, or air, or a thermal oil. However, it may also be a molten salt consisting of a mixture of two or three, or even more, specific salts used as thermal-transfer fluid.

For example, a mixture of sodium nitrate ($NaNO_3$) and potassium nitrate ($KNO_3$) is often used, for example at a 60%/40% ratio, forming an atmospheric-pressure eutectic with a melting temperature reduced to 220° C. and offering good chemical and thermal stability between the melting temperature and 600° C. By using a ternary mixture of salts, comprising lithium nitrate ($LiNO_3$) in addition to the two aforementioned salts, it is even possible to obtain a eutectic having a melting temperature as low as 120° C.

One major advantage of this mixture of salts is the possibility to store it in large quantities at high temperature and atmospheric pressure, at a reduced cost. The storage allows to separate the capture of solar energy and the production of electricity, independently from sunshine and solar hour, including at night.

The operating principle of a combined-cycle CSP power plant is known and for example described in document WO 2011/077248.

FIG. 1 diagrammatically shows the principle of a concentrated solar power plant of the tower type 1. The salt is maintained liquid in a first, insulated cold storage reservoir 2, at a temperature that is not lower than 260° C. Pumps 3 are necessary to bring the molten salt to the apex of the tower 1, and given the high flow rates required and the high density of the salt, the power absorbed by the pumps is relatively high, of an amplitude of 4 MW for a high-power power plant (typically 150 MW). At the apex of the tower, the salt is heated to 550° C. by the concentrated solar heat as specified above by means of one or more exchangers 20, distributed for example in four cavities, made up of thin-walled steel tubes. From there, the heated salt is returned to a second, insulated hot storage reservoir 5. The capacity of this reservoir depends on the supply duration required for the turbine that produces the electricity. When the production of electricity by the power plant is required, the hot salt is sent by a pump 6 to a conventional steam-generation system 7 to produce overheated steam for an electricity generator 9 having a turbine 8. FIG. 1 further shows a detailed example that is non-limiting with respect to the present invention, of a steam generator 7 according to the state of the art.

The molten salt circuit is referenced 17 and the water/steam circuit is referenced 18 in FIG. 1.

Standard performance levels for a 150 MW installation are provided in Table 1.

It is also known that hydraulic power recovery turbines 4 (HRPT) could be used in this type of installation. These may be installed in the line for returning the heated salt to the storage reservoir, in order to recover the mechanical (gravitational) energy from the salt descending from the apex of the tower to the ground, the recoverable power having a typical amplitude of 3 MW for the aforementioned power plant.

In addition to a certain number of advantages, such as large storage capacity for energy at atmospheric pressure, low cost of the salt compatible with environmental safety, complete lack of fire risk, great simplicity and reduced costs for the solar receiver and associated equipment at the apex of the tower, CSP power plants with towers have several drawbacks, including the need to use very specific pumps, the design of molten salt/water-steam exchangers and the need to monitor the relatively high temperatures of the molten salts.

Document WO 2011/018814 discloses a method for locally pressurizing a first circuit in which a first heated fluid at a first pressure flows, and for providing that first fluid to a heat exchanger in order to exchange heat with a second fluid flowing in a second circuit at a second pressure that is greater than the first pressure. A pressurizing means, such as a pump, is provided in the first circuit to increase the pressure of the first fluid upstream from the inlet of the exchanger to a pressure corresponding to that of the second fluid. On the return line of the first circuit, a pressure-reducing means is provided, such as a butterfly valve, to decrease the pressure of the first fluid downstream from the outlet of the exchanger. A hydraulic motor comprising a turbine or a centrifuge pump used as a turbine is inserted downstream from the butterfly valve. The hydraulic motor and the pressurizing pump are connected to a same variable-speed electric motor working on the same shaft. Thus, the hydraulic motor actuated by the stream of pressurized fluid returning from the heat exchanger not only lowers the pressure of the fluid itself, but further provides the power necessary to operate the pressurizing pump, which consequently reduces the external electricity contribution.

AIMS OF THE INVENTION

The present invention aims to overcome the drawbacks of the state of the art.

In particular, the invention aims to reduce the absorption of power of the pumps for conveying the heat-transfer fluid to the apex of the central tower or offset it by recovering power in another location.

MAIN CHARACTERISTICS OF THE INVENTION

A first aim of the invention relates to a device comprising at least one vertical pump and at least one associated turbine for transporting, over a level difference, a heat-transfer fluid brought to a high temperature, the pump ensuring an upward movement of said fluid in a first section of a pipe from a first so-called cold reservoir and the turbine being actuated by said fluid during the downward return movement of said fluid in a second section of the pipe toward a second so-called hot reservoir, wherein the device further comprises a device for mechanically coupling the turbine with the pump, said mechanical coupling device comprising a gearbox with a gimbal coupling located on the turbine side, allowing the mechanical energy produced by the turbine to be reused to actuate the pump.

According to preferred embodiments of the invention, the device further comprises one or a suitable combination of the following features:

- the turbine is of the same type as the pump, but is used in the opposite direction;
- the pump or the turbine is of the type having a vertical axis, and is mono- or multi-staged, (multi)cellular with wheels having closed or semi-open radial vanes;
- the pump or the turbine is situated above the reservoir or has an immersed body;
- the pump and the turbine are designed to operate with a mixture of molten salts selected from the group consisting of sodium nitrate, potassium nitrate and lithium nitrate;
- the pump and the turbine are designed to operate with a mixture of molten salts, the pressures of which may reach up to 60 bar;
- the pump and the turbine are designed to operate with a mixture of molten salts whereof the temperature is comprised between 100 and 600° C.

A second aim of the present invention relates to a concentrated solar power plant comprising:

- a plurality of heliostats positioned on the ground around a central concentration tower, said tower comprising at its apex at least one thermo-solar exchanger;
- a first circuit for transporting molten salts from a first so-called cold storage reservoir to said exchanger and returning the molten salts brought to high temperature to a second so-called hot storage reservoir, said exchanger being located at the apex of the tower, i.e. at a height greater than that of the reservoirs;
- a second circuit for generating steam by means of a thermal exchange with the first circuit of molten salts and for producing electricity by means of a turbine/generator system;

wherein the power plant further comprises the device comprising at least one vertical pump and at least one associated turbine as described above.

Advantageously, the level difference between the molten-salt storage reservoirs and the exchangers at the apex of the tower is at least 150 m.

SHORT DESCRIPTION OF THE DRAWINGS

Embodiments according to the state of the art and to the invention are described below with more detail using the appended figures.

FIG. 1, already mentioned, diagrammatically shows a concentrated solar power plant CSP of the type having a central tower, with molten-salt circulation and coupling to a conventional electricity-production system.

Figure 2:
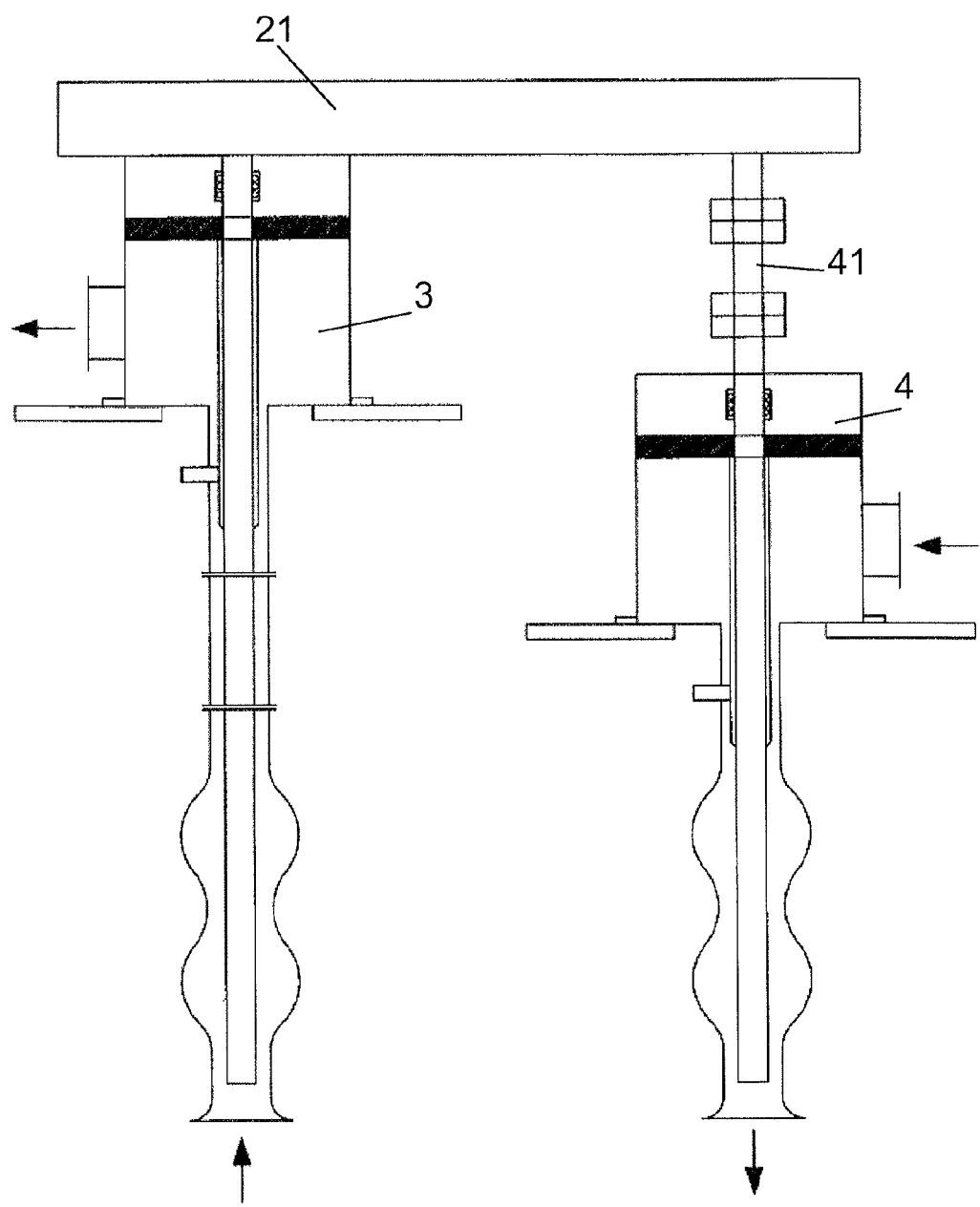

FIG. 2 shows a diagrammatic view of the mechanical coupling system according to the invention, between the pump for conveying the heat-transfer fluid to the central tower and the power-recovery turbine upon the return of the heat-transfer fluid to the storage reservoir.

DESCRIPTION OF PREFERRED EMBODIMENTS OF THE INVENTION

According to one preferred embodiment of the present invention, the pumps 3 and the power-recovery turbines 4 are mechanically coupled to each other in order to recover energy with the best possible yield.

A specific type of pump is necessary for the molten-salt application according to the invention. Such pumps will for example have the following features:

- vertical shaft;
- (multi)cellular, mono- or multi-staged construction with closed (or semi-open) wheels;
- installation above the salt reservoir, preferably with an immersed body, in order to simplify drainage;
- construction with a cantilevered shaft possible if the immersion depth of the pump, i.e., the distance between the bedplate and the suction tubing, is small enough; failing this, intermediate bearings necessary on the shaft line;
- shaft tightness with the bearing plate achieved by a labyrinth seal, with gravitational return of the leaks toward the reservoir;
- variable-frequency electric motor;
- use of appropriate materials and construction to withstand the high temperatures of the molten salts, etc. The materials used will for example withstand corrosion and abrasion.

Such pumps have already been used in the field of ground, parabolic solar collectors, but with relatively low fluid pressures.

The sizing of the pump must take into account the following three parameters: its length (for example, approximately 15 m), its variable speed and the high power required.

Advantageously, according to the invention, the power-recovery turbines will have the same design, optionally with specific vane wheels. In principle, operating the centrifugal pumps in the opposite direction suffices to achieve turbine mode. The pump-turbine mechanical coupling is ensured by a gearbox 21, with a gimbal coupler 41 on the turbine side in order to allow the differential expansions between the pump 3 and the turbine 4.

In the state of the art, only in-line coupling systems between horizontal pump and turbine, with clutch, are known.

Of course, the turbines 4 cannot recover the whole power consumed by the pumps, given the yields of the pumps and turbines, working in opposite directions.

Still according to the invention, the power difference will be compensated for by electric pumps of the same type (not shown), that are necessary to overcome pressure losses and to start the system anyway.

KEY 1 solar concentration tower
2 cold salt reservoir
3 supply pump to the tower
4 recovery turbine
5 hot salt reservoir
6 flow pump toward the steam generator
7 steam generator
8 turbine(s)
9 electricity generator
10 condenser
11 deaerator
12 economizer
13 kettle boiler
14 superheater
15 repeater
16 mixing pump
17 molten-salt circuit
18 water/steam circuit
20 solar receivers and exchangers
21 gear box
41 cardan shaft

TABLE 1

| | | TOWER | | TURBINE CYCLE | Rated |
|---|---|---|---|---|---|
| Duration | hours | 6 | | 24 | 17.9 |
| Storage | Therm MWh | 2553 | Elec MWh | 894 | 894 |
| Absorbed power | MW | 425 | Turbine | 37.3 | 50 |
| Salt flow rate | kg/s | 970 | To the exchangers | 242 | 325 |
| Temp. of the cold reservoir | ° C. | 260 | Condenser T | ° C. | 45.8 |
| Hot reservoir temperature | ° C. | 550 | Condenser P | bar | 0.10 |
| Salt weight | tons | 20952 | Deaerator T | ° C. | 105 |
| Volume | m³ | 12040 | | | |
| Diameter | m | 31 | | | |
| Height | m | 16 | | | |
| Steam flow rate | kg/s | | | 30.8 | 41.2 |
| Steam pressure | bar | | | 120 | 120 |
| Steam temperature | ° C. | | | 530 | 530 |
| Reheating pressure | bar | | | 20 | 20 |
| Reheating temperature | ° C. | | | 530 | 530 |

The invention claimed is:

1. A device comprising at least one centrifugal vertical axis pump (3) and at least one associated centrifugal vertical axis turbine (4) for transporting, over a level difference, a heat-transfer fluid brought to a high temperature, the pump (3) ensuring an upward movement of said fluid in a first section of a pipe (17) from a first cold storage reservoir (2) and the turbine (4) being actuated by said fluid during the downward return movement of said fluid in a second section of the pipe (17) toward a second hot storage reservoir (5), wherein the device further comprises a mechanical device for coupling the turbine (4) with the pump (3), said mechanical coupling device comprising a gearbox (21) with a gimbal coupling (41) located on the turbine (4) side, allowing the mechanical energy produced by the turbine (4) to be reused to actuate the pump (3), and wherein the centrifugal turbine (4) is a device substantially identical to the centrifugal pump (3) and has a vertical axis parallel to and of the same orientation as the centrifugal pump (3), but operated for having fluid flowing in the opposite direction.

2. The device according to claim 1, wherein the pump (3) or the turbine (4) is mono- or multi-staged, uni- or multi-cellular and has wheels with closed or semi-open radial vanes.

3. The device according to claim 1, wherein the pump (3) and the turbine (4) are designed to operate with a mixture of molten salts selected from the group consisting of sodium nitrate, potassium nitrate and lithium nitrate.

4. The device according to claim 1, wherein the pump (3) and the turbine (4) are designed to operate with a mixture of molten salts having pressures up to 60 bar.

5. The device according to claim 1, wherein the pump (3) and the turbine (4) are designed to operate with a mixture of molten salts whereof the temperature is comprised between 100 and 600° C.

6. A concentrated solar power plant comprising:
- a plurality of heliostats positioned on the ground around a central concentration tower (1), said tower comprising at its apex at least one thermo-solar exchanger (20);
- a first circuit (17) for transporting molten salts from the first cold storage reservoir (2) to said exchanger (20) and returning the molten salts brought to high temperature to second storage reservoir (5), said exchanger (20) being located at the apex of the tower (1), a height that is greater than that of the reservoirs (2, 5);
- a second circuit (18) for generating steam by means of heat exchange with the first circuit (17) of molten salts and producing electricity by means of a turbine/generator system (7, 8, 9);

wherein the power plant further comprises the device comprising at least one vertical axis pump (3) and at least one associated vertical axis turbine (4) according to claim 1.

7. The device according to claim 1, wherein the centrifugal vertical axis turbine (4) is a reverse pump of the same design as the at least one centrifugal vertical axis pump (3) but with different vane wheels.

* * * * *

UNITED STATES PATENT AND TRADEMARK OFFICE
CERTIFICATE OF CORRECTION

PATENT NO. : 9,803,625 B2
APPLICATION NO. : 14/403844
DATED : October 31, 2017
INVENTOR(S) : Alfred Dethier Page 1 of 1

It is certified that error appears in the above-identified patent and that said Letters Patent is hereby corrected as shown below:

In the Claims

Column 6, Line 34, Claim 6, before the word "storage" insert the word --hot--

Signed and Sealed this
Thirteenth Day of February, 2018

Andrei Iancu
*Director of the United States Patent and Trademark Office*